United States Patent Office 3,701,650
Patented Oct. 31, 1972

3,701,650
COPPER, NICKEL, COBALT AND IRON SEPARATION PROCESS
Abraham J. van der Zeeuw, Amsterdam, Netherlands, assignor to Shell Oil Company, New York, N.Y.
No Drawing. Filed June 29, 1970, Ser. No. 50,920
Claims priority, application Great Britain, June 30, 1969, 32,905/69
Int. Cl. C22b 15/12, 23/04
U.S. Cl. 75—101 BE                    4 Claims

ABSTRACT OF THE DISCLOSURE

Copper, nickel and cobalt values are selectively recovered from aqueous solutions also contining iron values by the process of (1) extracting from the solution the copper, nickel, cobalt and iron values employing certain secondary and tertiary carboxylic acids as extraction agent and (2) selectively and sequentially reducing the copper value, the nickel value and finally the cobalt value present in the organic extract to sequentially isolable metallic precipitates under controlled hydrogen reduction conditions.

BACKGROUND OF THE INVENTION

When metals are leached from their ores, salts of the metals concerned are obtained in aqueous solution. In most cases a solution of salts of two or more metals in water is obtained. For example, when lateritic ores are leached, nickel, copper, cobalt and iron are all carried into the leach liquor. The separation and isolation of the several metals present in such aqueous leach solutions gives rise to difficulties. Extraction techniques have been developed whereby certian of the metal values are transferred from aqueous solutions into liquid organic media. Although it is possible to achieve a separation of metals by selective extraction, separation of very similar metals (e.g., nickel and cobalt) can only be effected with great difficulties, many extraction steps being necessary in order to obtain a sufficient degree of separation. Moreover, if during the extraction the pH of the aqueous solution to be extracted is not very carefully regulated, mixtures of metal compounds may be extracted into the organic phase.

STATEMENT OF THE INVENTION

It has now been found that copper, cobalt, nickel and iron values present in an aqueous leach liquor can be easily separated from one another by (1) unselectively extracting the metal values into a solution of certain carboxylic acids in a water-immiscible organic solvent and (2) selectively and sequentially reducing the copper, nickel and cobalt values present in the solution as compounds with the carboxylic acids, to the metallic state with hydrogen and separating the precipitated metals. More specifically, it has been found that when an aqueous solution containing copper, cobalt, nickel and iron values is intimately contacted with a water-immiscible organic solution of certain secondary and tertiary carboxylic acids substantially all the copper, cobalt, nickel and iron values present in the aqueous solution are extracted as compounds with the secondary and tertiary carboxylic acids into the organic phase and that the copper, nickel and cobalt values may then be separately recovered from the organic phase by reduction; any copper present as a compound in the organic extract being selectively reduced to recoverable metallic copper by contact of the organic phase with hydrogen under mild conditions, any nickel being selectively reduced to recoverable metallic nickel by contact of the organic phase with hydrogen under more intense reduction conditions, and any cobalt being selectively reduced to recoverable metallic cobalt by contact of the organic phase with hydrogen under yet more intense reduction conditions. The iron value present in the organic extract, which generally is considered to be a contaminant, is not reduced by contact with hydrogen at the conditions employed and remains in the organic phase.

DETAILED DESCRIPTION OF THE INVENTION

The process of the invention consists of two steps, an extraction step followed by a sequential reduction step.

The extraction step.—The extraction step comprises the intimate contacting of an aqueous leach liquor feed, containing metal values, with a solution of certain secondary and tertiary carboxylic acids in a solvent substantially immiscible in aqueous solutions in order to effect the removal of essentially all (i.e., at least about 90%) the metal values from the aqueous liquor into the organic phase.

The aqueous leach liquor contains at least two of the metal values of the group of copper values, nickel values, cobalt values and iron values. Suitable leach liquors thus may contain, for example, copper and nickel values; copper and cobalt values; nickel and cobalt values; nickel and iron values; cobalt and iron values; copper, cobalt and nickel values; nickel, cobalt and iron values; or copper, nickel, cobalt and iron values. The leach liquor is preferably acidic, and most preferably has a pH less than 5. The solution of carboxylic acids employed as extraction agent comprises a solution of a mixture of secondary and tertiary aliphatic carboxylic acids of from 7 to 15 carbon atoms per molecule. These acids, herein termed "mixed secondary and tertiary acids," are produced by reaction of hydrocarbon olefins with carbon monoxide and water in the presence of a highly acidic catalyst such as sulfuric acid, phosphoric acid, hydrofluoric acid, boron trifluoride or mixtures thereof. The resulting product is essentially devoid of primary carboxylic acids and consists of secondary or tertiary carboxylic acids, that is, acids of from two to three alkyl substituents on the carbon atom alpha to the carboxyl group, depending upon the nature of the olefin feed. Generally, tertiary acids predominate. For example, from a highly branched nonene feed, a mixture of some secondary but predominantly tertiary decanoic acids is produced. Other illustrative olefin feeds include 1-octene, diisobutylene, 1-dodecene and propylene tetramer as well as mixtures of olefins such as are obtained by cracking of paraffin waxes or petroleum fractions. A particularly useful acid mixture comprises a mixture of acids of 9 to 11 carbon atoms, predominantly 10 carbon atoms, obtained by reaction of propylene trimer with carbon monoxide and water under acid conditions. A further description of methods of producing the mixed secondary and tertiary acids is provided by British Pats. Nos. 743,597 and 798,065.

It is unexpected that these predominantly tertiary acids would form compounds with copper, nickel and cobalt which are especially suitable for selective hydrogen reduction. These acids, especially the tertiary acids, having very hindered structure. It might be expected that these acids would form compounds which would be tightly covalently bonded in organic solution and which would be difficult, at best, to reduce without resort to hydrogenation conditions which would be so severe as to destroy substantial amounts of the acids and the solvent.

The amount of carboxylic acid employed is suitably chosen to provide at least 1 gram-atom of acid per gram-atom of metal value to be extracted. It is preferred to use from 2 to 20 gram-atoms of acid per gram atom of metal values.

The carboxylic acid is employed as a solution in an organic solvent which is substantially immiscible, if miscible at all, in the aqueous phase. Suitable solvents include halogenated hydrocarbons, e.g., chloroform, 1,2-dichloroethane and methylene bromide, and hydrocarbons, either aliphatic or aromatic, including dodecane, cyclohexane and benzene or mixtures of hydrocarbons such as kerosene and other preferred solvents. Kerosene is a most preferred solvent.

The extraction process is conducted by contacting the aqueous leach liquor and the organic solution of carboxylic acids, the relative proportions of which are not critical, in a batch type or continuous process. In the latter modification, a multi-stage continuous countercurrent extraction is preferred. In any modification, sufficient agitation is provided, as by stirring, to insure adequate phase contact. The extraction is conducted at any convenient temperature and pressure so long as the various solvent media remain in the liquid phase. Ambient temperature and pressure are satisfactory and are preferred as a matter of convenience. Following contact, the aqueous and organic phases are separated by conventional procedures.

The selective reduction step.—Depending on the number of metal values which are extracted into the organic phase and which are desired to be separated, one or more selective hydrogen reductions are carried out to recover the individual metals. Mild hydrogenation conditions are required to reduce the dissolved copper compounds to copper metal. Somewhat more severe conditions are required to reduce nickel as compounds with the secondary and tertiary acids, while cobalt requires even more severe conditions. The reaction temperature, hydrogen pressure, and reaction time are all measures of the severity of the hydrogenation. These three parameters are interdependent.

Copper is preferentially reduced from the carboxylic acid metal complex-containing solutions produced in the extraction step by contacting the solutions with hydrogen at low temperature or low hydrogen pressure. Temperatures as low as 70° C. are suitable for copper reduction when hydrogen pressures of about 40 atmospheres are employed, while hydrogen pressures as low as one atmosphere are suitable with temperatures in the range of from 150 to 190° C. Preferred copper preferential reduction conditions are in the ranges; temperatures 70–110° C., hydrogen pressure 10 to 40 atmospheres and reaction time of from ½ to 2 hours. Most preferred conditions for preferential reduction of copper from organic solutions as prepared in the extraction step, are conditions of temperature, pressure and time selected to effect the reduction of at least about 70% and preferably at least about 90% of the copper value present in the organic solution with not more than about 10% of the nickel or other metal values being reduced, for example temperatures 75 to 100° C., hydrogen pressure 10 to 35 atmospheres and reaction time ½ to 1 hour.

Nickel is preferentially reduced from copper value-free organic solutions, either as prepared in the extraction step or as will result when copper is selectively reduced and removed from a copper value-containing organic solution prepared in the extraction step when the reduction temperature is chosen above 110° C. and the hydrogen pressure for reduction is chosen above 10 atmospheres. For example, nickel is reduced at temperature of 170° C. and pressures of 15 atmospheres or at temperature of 110° C. and pressures of 75 atmospheres. Preferred nickel preferential reduction conditions are conditions of temperature, pressure and time selected to effect the reduction of at least about 70% and preferably at least about 90% of the nickel present in the organic solution with not more than about 10% of any cobalt or iron value present being reduced, for example in the ranges; temperatures 120 to 170° C., hydrogen pressure 15 to 75 atmospheres and reaction time ½ to 3 hours. Most preferred conditions for preferential reduction of nickel from organic solutions of the invention are temperatures 120 to 170° C., hydrogen pressure 20 to 60 atmospheres and reaction time 1 to 2 hours.

Cobalt is preferentially reduced from copper and nickel value-free, iron-containing, organic solutions containing the certain secondary and tertiary carboxylic acids of the invention by contact with hydrogen at either high temperatures or high hydrogen pressures. Cobalt is preferentially reduced at a temperature of about 210° C. or greater at hydrogen pressures of about 35 atmospheres. Cobalt may also be preferentially reduced at a temperature as low as 140° C. when hydrogen pressures of about 100 atmospheres are employed. Preferred cobalt preferential reduction conditions are temperatures 160 to 210° C., hydrogen pressure 35 to 100 atmospheres and reaction time ¾ to 4 hours. Most preferred cobalt reduction conditions are conditions which effect an essentially complete (i.e., at least 90%) reduction of the cobalt value present, for example temperatures 175 to 200° C., hydrogen pressure 40 to 75 atmospheres and reaction time 1 to 2 hours.

After each of these selective reductions, the solid particles of metal formed may be separated from the liquid organic medium by any suitable means, for example, filtration, centrifugation, decantation, and the like. The solid metals after separation may be collected and treated by conventional means, such as compaction or fusion.

It is often of advantage to have so-called seed materials present in the liquid organic extract during the reduction in order to initiate the formation of particles of solid metal. Finely divided metal powder, finely divided carbon, and in particular finely divided carbon-carrying some palladium are very suitable. Preferred seed materials are powders of the metal to be precipitated during the selective reduction step. It has been found that by the use of seed materials, lower reaction temperatures, pressures and shorter reaction times may be used and that higher selectivities of reduction may be obtained. The amount of seed material to be used is generally at least 0.01 gram per liter and preferably is between 0.1 gram per liter and 3 grams per liter.

The following examples are illustrative of the practice of the invention. It is to be understood that these examples are given only for illustration and are not to be construed as limiting the invention in any way.

Example I 500 ml. of an aqueous solution of nickel sulfate and copper sulfate which contained 5 g. of nickel and 5 g. of copper was extracted with 1000 ml. of kerosene containing one molar equivalent of a mixture of secondary and tertiary carboxylic acids with 10 carbon atoms. After extraction, all the meals were present in the organic phase. A series of reduction were then carried out. In each hydrogenation experiment 200 ml. of this organic phase was brought into a 2 l. glass lined rotating autoclave, which was rinsed with hydrogen, and finally pressurized with hydrogen and closed. The temperature of the autoclave was raised to the desired value in from 30 to 45 minutes and kept at the desired value for one hour. Hereafter the autoclave was rapidly cooled to room temperature, the pressure was released, and the precipitated metal value was removed by filtration. In the filtrate the amounts of nickel and copper were determined. The results are shown in Table I, wherein the pressures given are the initial pressures at the desired temperatures of hydrogenation. The pressure hardly decreases during the reaction. It can be seen from the table that at the mild reduction conditions employed, copper is preferentially reduced, and that a high copper reduction (>95%) can be achieved with very slight nickel reduction when the temperature is chosen below 120° C.

TABLE I

| Experiment No. | Temperature, ° C. | Pressure (atmospheric) | Percent of— | |
|---|---|---|---|---|
| | | | Nickel reduced | Copper reduced |
| 1 | 120 | 15 | 37 | 99 |
| 2 | 80 | 35 | 3 | 97 |

Example II 500 ml. of an aqueous solution of cobalt sulfate and nickel sulfate, which contained 7.5 g. of cobalt and 2.5 g. of nickel, were extracted with 1000 ml. of a solution of one molar equivalent of a mixture of secondary and tertiary carboxylic acids with 10 carbon atoms in kerosene. After extraction all the metals were present in the organic phase. In each hydrogenation experiment 200 ml. of this organic phase was brought into a 2 l. glass lined rotating autoclave, which was rinsed with hydrogen, and finally pressurized with hydrogen and closed. The temperature of the autoclave was raised to the desired value in from 30 to 45 minutes and kept at the desired value for one or one-half hour. Hereafter the autoclave was rapidly cooled to room temperature, the pressure was released, and the precipitated metal value was removed by filtration. In the filtrate, the amounts of nickel and cobalt were determined. The results are shown in Table II, wherein the pressures given are the initial pressures at the desired temperatures of hydrogenation. The pressure hardly decreases during the reaction. It can be seen from the table that, at conditions more severe than used in Example I, nickel is preferentially reduced, and (experiments 6 and 8) that a high nickel reduction (>90%) can be achieved without any cobalt reduction.

TABLE II

| Experiment No. | Temperature, ° C. | Time, hours | Pressure (atmospheric) | Percent of— | |
|---|---|---|---|---|---|
| | | | | Nickel reduced | Cobalt reduced |
| 3 | 180 | 1 | 55 | 96 | 78 |
| 4 | 160 | 1 | 53 | 97 | 27 |
| 5 | 140 | 1 | 54 | 89 | 21 |
| 6 | 160 | ½ | 35 | 92 | 0 |
| 7 | 160 | 1 | 35 | 98 | 20 |
| 8 | 160 | 1 | 10 | 91 | 0 |

Example III

A series of hydrogenations were carried out to demonstrate the separations according to the invention. The feeds employed consisted of kerosene containing 1 molar equivalent per liter of secondary and tertiary carboxylic acids predominantly with 10 carbon atoms, metals (as salts of the carboxylic acids) and, as seed material, 3 g./l. of 10% palladium on carbon. Hydrogenation was carried out as described in the previous examples.

TABLE III

| Experiment No. | Composition of feed, g./l. | | | | Reaction conditions | | | Metal reduced, percent | | | |
|---|---|---|---|---|---|---|---|---|---|---|---|
| | Cu | Ni | Co | Fe | Temperature, ° C. | $H_2$ pressure at— | Time, Hours | Cu | Ni | Co | Fe |
| 9 | | 2.5 | 7.5 | | 160 | 52 | 0.5 | | 92 | Nil | |
| 10 | | 2.5 | 7.5 | | 160 | 10 | 1 | | 91 | Nil | |
| 11 | | 2.5 | 7.5 | | 160 | 52 | 1 | | 97 | 27 | |
| 12 | 3.1 | 3.0 | | | 120 | 44 | 1 | 99 | 82.5 | | |
| 13 | 3.1 | 3.0 | | | 120 | 20 | 1 | 99 | 37 | | |
| 14 | 3.1 | 3.0 | | | 80 | 33 | 1 | 97 | 3 | | |
| 15 | | 2.5 | | 0.01 | 160 | 53 | 1 | | 96 | | Nil |
| 16 | | 2.5 | | 0.01 | 160 | 20 | 1 | | 96 | | Nil |
| 17 | | 2.5 | | 0.01 | 160 | 12 | 1 | | 99 | | Nil |
| 18 | | 2.5 | | 0.01 | 150 | 53 | 1 | | 96 | | Nil |

Example IV

Two experiments were conducted to demonstrate the use of extremely low hydrogen pressures to effect the mild initial reduction of copper. These experiments were conducted with the procedures of Example I, with the difference that atmospheric pressure hydrogen was employed and the temperature was 180° C. The feed contained 0.05 mole/l. each of copper and nickel salts of the ten carbon tertiary acids. One reduction was halted after ½ hour, the other after an hour. After ½ hour, 80% of the copper was reduced whereas the nickel remained in solution. After 60 minutes 93% of the copper was reduced, whereas the nickel was not reduced.

I claim as my invention:

1. The process of separately recovering copper value from an aqueous solution containing in addition to copper value at least one other metal value of the group consisting of nickel value, and cobalt value which comprises (1) intimately contacting the aqueous solution with a solution of from 2 to 20 gram-atoms per gram-atom of copper value and other metal values of a mixture of carboxylic acids of from 7 to 15 carbon atoms having from two to three alkyl substituents on the carbon atom alpha to the carboxyl group in an organic solvent substantially immiscible with the aqueous phase, thereby extracting a major proportion of the copper value and other metal values of the aqueous solution into the resulting organic extract from the resulting aqueous raffinate and (2) intimately contacting the organic extract with hydrogen for from ½ to 2 hours at a temperature in the range of from 70 to 110° C. and a hydrogen pressure in the range of from 10 to 40 atmospheres, thereby substantially reducing the copper value to metallic copper precipitate, and separating the copper precipitate from the resulting other metal value-containing copper value-poor organic extract.

2. The process of separately recovering nickel value from an aqueous solution containing in addition to nickel value cobalt value which comprises (1) intimately contacting the aqueous solution with a solution of from 2 to 20 gram-atoms per gram-atom of nickel value and cobalt value of a mixture of aliphatic carboxylic acids of from 7 to 15 carbon atoms having from two to three alkyl substituents on the carbon atom alpha to the carboxyl group in an organic solvent substantially immiscible with the aqueous phase, thereby extracting a major proportion of the nickel value and cobalt value of the aqueous solution into the resulting organic extract from the resulting aqueous raffinate; (2) intimately contacting the organic extract with hydrogen gas at a temperature in the range of from 120 to 170° C., a hydrogen pressure in the range of from 15 to 75 atmospheres for from ½ to 3 hours, thereby substantially reducing the nickel value to metallic nickel precipitate, and separating the nickel precipitate from the resulting cobalt value-containing nickel value-poor organic extract.

3. The process of separately recovering cobalt value from an aqueous solution also containing in addition to cobalt value iron value which comprises (1) intimately contacting the aqueous solution with a solution of from 2 to 20 gram-atoms per gram-atom of cobalt value and iron value of a mixture of aliphatic carboxylic acids of from 7 to 15 carbon atoms having from two to three alkyl substituents on the carbon atom alpha to the carboxyl group in an organic solvent substantially immiscible with the aqueous phase, thereby extracting a major proportion of the cobalt value and iron value of the aqueous solution into the resulting organic extract from the resulting aqueous raffinate; (2) intimately contacting the organic extract with hydrogen gas at a temperature in the range of from 175 to 200° C., a hydrogen pressure in the range of from 40 to 75 atmospheres for from 1 to 2 hours, thereby substantially reducing the cobalt value to metallic cobalt precipitate, and separating the cobalt precipitate from the resulting cobalt value-poor iron value-containing organic extract.

4. The process of separately recovering copper, nickel and cobalt values from an aqueous solution also containing iron values which comprises (1) intimately contacting the aqueous solution with a solution of from 2 to 20 gram-atoms per gram-atom of copper, nickel, cobalt and iron value of a mixture of aliphatic carboxylic acids of from 7 to 15 carbon atoms having from two to three alkyl substituents on the carbon atom alpha to the carboxyl group in a hydrocarbon solvent substantially immiscible with the aqueous phase, thereby extracting a major proportion of the copper, nickel, cobalt and iron values of the aqueous solution into the resulting organic extract from the resulting aqueous raffinate, (2) intimately contacting the organic extract with hydrogen gas for from ½ to 1 hour at a temperature in the range of from 75 to 100° C. and a hydrogen pressure of from 10 to 35 atmospheres, thereby substantially reducing the copper value in the organic extract to metallic copper precipitate, and separating the copper precipitate from the resulting copper value-poor organic extract, (3) intimately contacting the copper-poor organic extract with hydrogen gas for from 1 to 2 hours at a temperature of from 120° to 170° C. and a hydrogen pressure of from 20 to 60 atmospheres, thereby substantially reducing the nickel value in the organic extract to metallic nickel precipitate and separating the nickel precipitate from the resulting copper- and nickel-poor organic extract and (4) intimately contacting the copper- and nickel-poor organic extract with hydrogen gas for from 1 to 2 hours at a temperature of from 175° to 200° C. and a hydrogen pressure of from 40 to 75 atmospheres thereby substantially reducing the cobalt value in the organic extract to metallic cobalt precipitate and separating the cobalt precipitate from the resulting iron-containing organic extract.

References Cited

UNITED STATES PATENTS

| | | | |
|---|---|---|---|
| 3,532,490 | 10/1970 | Burkin | 75—101 BE UX |
| 2,836,485 | 5/1958 | Schaufelberger et al. | 75—108 X |
| 3,507,645 | 4/1970 | Spitzer et al. | 75—101 BE X |

GEORGE T. OZAKI, Primary Examiner

U.S. Cl. X.R.

75—108, 117, 119, .5 A